US012290866B2

(12) United States Patent
Kreutter

(10) Patent No.: US 12,290,866 B2
(45) Date of Patent: May 6, 2025

(54) SYSTEMS AND METHODS FOR CUTTER RAM RETURN

(71) Applicant: Milwaukee Electric Tool Corporation, Brookfield, WI (US)

(72) Inventor: William Kreutter, Mosinee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 82 days.

(21) Appl. No.: 17/686,140

(22) Filed: Mar. 3, 2022

(65) Prior Publication Data

US 2022/0281020 A1    Sep. 8, 2022

Related U.S. Application Data

(60) Provisional application No. 63/156,197, filed on Mar. 3, 2021.

(51) Int. Cl.
*B23D 15/14* (2006.01)
*B23D 29/00* (2006.01)

(52) U.S. Cl.
CPC ............ *B23D 15/14* (2013.01); *B23D 29/002* (2013.01)

(58) Field of Classification Search
CPC ...... B23D 15/14; B23D 29/002; B23D 23/00; B23D 29/00; B25B 27/10; Y10T 83/8853
USPC .............. 83/635; 72/409, 416, 456, 453.16; 81/421, 422
See application file for complete search history.

(56) References Cited

U.S. PATENT DOCUMENTS

| | | | | |
|---|---|---|---|---|
| 2,344,743 A | * | 3/1944 | Smith, Jr. ............. | B21D 22/12 72/63 |
| 3,243,984 A | * | 4/1966 | Hoffmann ............ | B21C 23/085 72/255 |
| 3,263,481 A | * | 8/1966 | Boyd ................. | H01R 43/0427 72/432 |
| 3,972,218 A | * | 8/1976 | Pawloski ........... | H01R 43/0427 72/452.8 |
| 4,187,708 A | * | 2/1980 | Champoux ............ | B23P 9/025 72/30.1 |
| 4,339,942 A | | 7/1982 | Svensson | |
| 4,587,732 A | * | 5/1986 | Lind ...................... | H02G 1/005 137/635 |
| 4,823,588 A | * | 4/1989 | Bussereau ............ | F15B 11/036 91/24 |
| 5,425,164 A | * | 6/1995 | El Dessouky ........ | B21J 15/205 29/243.524 |
| 6,446,482 B1 | | 9/2002 | Heskey et al. | |

(Continued)

FOREIGN PATENT DOCUMENTS

CN    102937124 B    11/2015
CN    104329302 B    4/2016

(Continued)

*Primary Examiner* — Ghassem Alie
(74) *Attorney, Agent, or Firm* — Quarles & Brady LLP

(57) ABSTRACT

Embodiments of the invention provide systems and methods for ram return in cutting tools. A cutting tool can include a frame, a cutting blade coupled to the frame, and an outer ram coupled to the frame. The outer ram can include a bore to receive hydraulic fluid to provide a first stage of movement for the cutting blade into to a cutting position. The cutting tool can also include an inner ram, an extension spring, a compression spring, or a gas spring to provide a second stage of movement to return the ram and the cutting blade to a non-cutting position.

13 Claims, 11 Drawing Sheets

(56) References Cited

U.S. PATENT DOCUMENTS

| | | | |
|---|---|---|---|
| 6,668,613 B2 * | 12/2003 | Lefavour | ............... B25B 27/10 |
| | | | 30/180 |
| 6,986,274 B2 | 1/2006 | Lefavour et al. | |
| 7,066,003 B2 | 6/2006 | Lefavour et al. | |
| 7,107,814 B2 * | 9/2006 | Winterhalter | ....... F15B 15/1442 |
| | | | 72/391.2 |
| 7,124,619 B1 | 10/2006 | Lefavour et al. | |
| 8,033,756 B2 | 10/2011 | Adamson | |
| 8,833,465 B2 | 9/2014 | Kotrla et al. | |
| 9,303,479 B2 | 4/2016 | Kotrla et al. | |
| 9,551,200 B2 | 1/2017 | Read et al. | |
| 10,054,139 B2 | 8/2018 | Craciun et al. | |
| 10,109,971 B2 | 10/2018 | LeFavour et al. | |
| 10,428,843 B2 | 10/2019 | Ballard et al. | |
| 10,554,006 B2 | 2/2020 | Trombley | |
| 10,851,805 B2 | 12/2020 | Thomson et al. | |
| 2017/0355027 A1 * | 12/2017 | D-Antuono | ........... B23P 11/005 |
| 2019/0123502 A1 | 4/2019 | Lefavour et al. | |
| 2020/0185872 A1 | 6/2020 | Trombley | |
| 2020/0290190 A1 | 9/2020 | Pomeroy et al. | |

FOREIGN PATENT DOCUMENTS

| | | | |
|---|---|---|---|
| CN | 108286419 B | 12/2020 | |
| JP | 2019162650 A | 9/2019 | |
| WO | WO-2013189774 A1 * | 12/2013 | ............. B23D 15/04 |

* cited by examiner

SYSTEMS AND METHODS FOR CUTTER RAM RETURN

RELATED APPLICATIONS

This application claims priority to U.S. provisional patent application No. 63/156,197, titled "Systems and Methods for Cutters" and filed Mar. 3, 2021, the entirety of which is incorporated herein by reference.

BACKGROUND

Work tools, such as cutting tools, allow operators to implement various functionalities on many different components (e.g., electrical wires, power cables, sheet metal, etc.). For example, some cutting tools can include a cutting head that is driven (e.g., hydraulically or electrically) into a component, such as a power wire, to cut through the power wire. The cutting tools may include one or more movable blades that are actuatable by a hydraulic or electromechanical actuation system. By providing power to the actuation system, the blades move relative to each other to perform operations such as cutting, crimping, separation, blanking, etc.

SUMMARY

Embodiments of the invention provide a hydraulic cutter tool. The cutter tool can include a frame, a cutting blade coupled to the frame, and an outer ram. The outer ram can include an outer bore to receive hydraulic fluid and the outer ram can be coupled to the frame. A conduit tube can include a ram cavity and can be positioned inside the outer bore. An inner ram can include an inner bore to receive hydraulic fluid. The inner ram can be positioned inside the ram cavity and the inner ram can be coupled to the frame. The inner ram can include an annular groove formed therein. A seal can be positioned in the annular groove to prevent leakage from the inner bore to the outer bore. The inner bore can fill with hydraulic fluid before the outer bore to move the inner ram and the outer ram into an extended position to actuate the cutting blade. An extension spring can extend along a length of the inner bore. The extension spring can retract the inner ram and the outer ram into a compressed position.

Some embodiments of the invention provide a hydraulic cutter tool that includes a frame, a cutting blade coupled to the frame, a ram plate extending through the frame, and an actuator plate. A first tie rod can be coupled to the ram plate and the actuator plate. A second tie can be coupled to the ram plate and the actuator plate, separate from the first tie rod. A hydraulic cylinder can be coupled between the ram plate and the actuator plate. An extension spring can be arranged outside of the hydraulic cylinder. The extension spring can be compressed between the actuator plate and the ram plate. In use, when hydraulic fluid fills the hydraulic cylinder, the actuator plate can compress the extension spring to move the ram plate and the cutting blade into a cutting position. When the hydraulic cylinder reaches a threshold pressure, the hydraulic fluid can exit the hydraulic cylinder and the extension spring can cause the actuator plate to retract the ram plate and the cutting blade to a non-cutting position.

Some embodiments provide a hydraulic cutter tool. The hydraulic cutter tool can include a frame, a cutting blade coupled to the frame, a ram plate extending through the fame, and a hydraulic cylinder. The hydraulic cylinder can be coupled to the ram plate and can include a bore to receive hydraulic fluid. A hydraulic actuator can be coupled to the hydraulic cylinder. A piston can be coupled to the hydraulic actuator and a gas spring can be coupled to the ram plate. Gas within the gas spring can be compressed as the hydraulic cylinder fills with hydraulic fluid. The hydraulic cylinder can move the ram plate and the cutting blade to a cutting position. When hydraulic fluid within the hydraulic cylinder reaches a threshold pressure and hydraulic fluid exits the hydraulic cylinder, the gas within the gas spring can be released to return the ram plate and the cutting blade to a non-cutting position. In some embodiments, a hydraulic cutter tool can include a ram plate, a hydraulic cylinder, and a first piston that provide a first stage of cutting movement. The gas spring can provide a second state of ram return movement to a non-cutting position.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
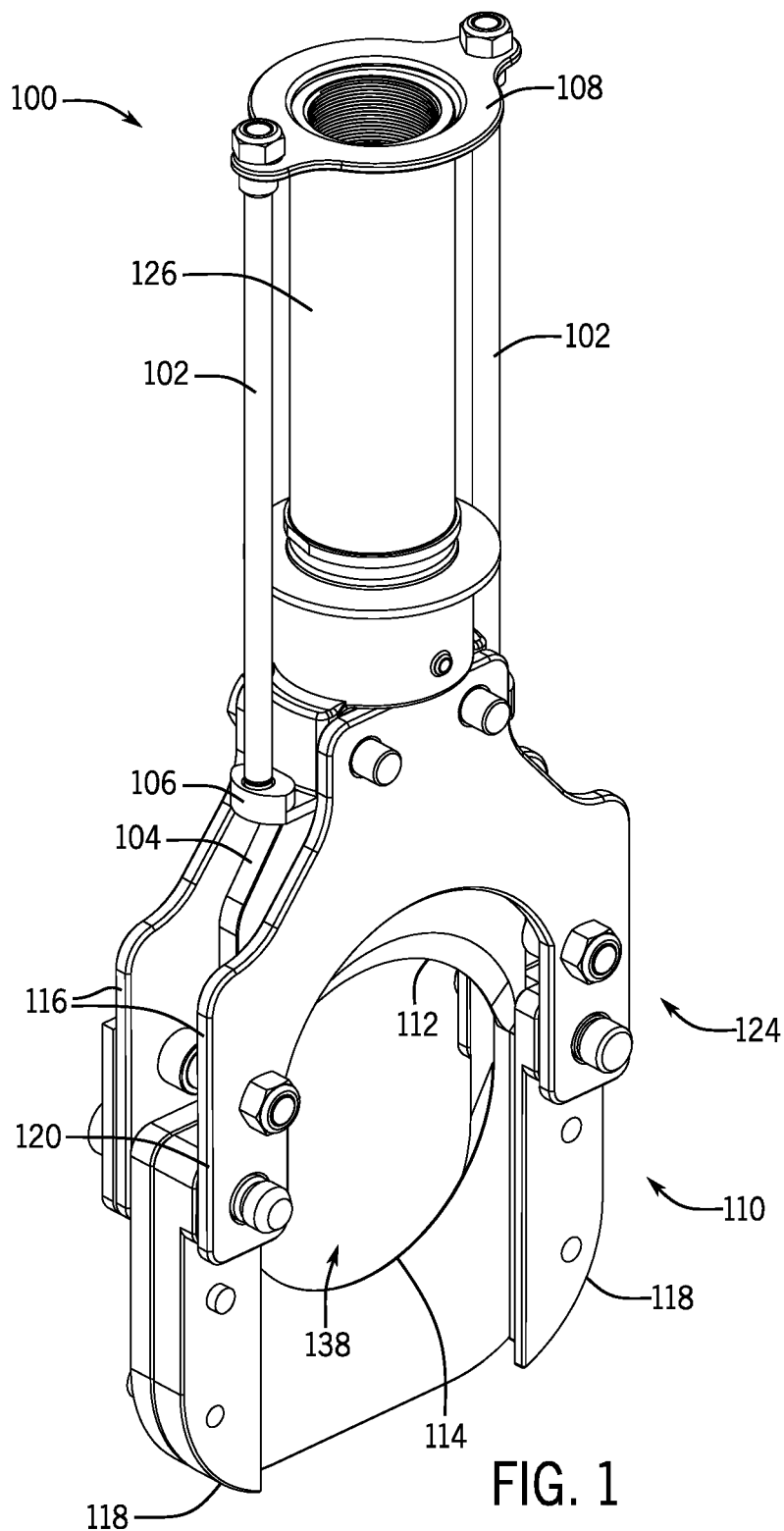
FIG. 1 is an isometric view of a cutting tool according to an embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Work tools generally can implement various functionalities on different components. For example, work tools generally can include an actuator that includes a moveable component that when moved into contact with the component, implements some kind of functionality on the component. For example, such as when the work tool is implemented as a cutting tool, the actuator of the cutting tool can include a cutting head that can, when moved into contact with a component (e.g., a wire to be cut) can sever the wire in two. As another example, such as when the work tool is implemented as a crimping tool, the actuator of the crimping tool can include a crimping head that can, when moved into contact with a component (e.g., a wire to be crimped), can crimp the wire (e.g., to create an electrical connection to the wire).

FIGS. 1-7 illustrate a cutting tool 100 according to some embodiments of the invention. Although the example implementation described herein references an example cutting tool, it should be understood that the features of this disclosure can be implemented in any other tool. In addition, any suitable size, shape or type of elements or materials could be used. In some embodiments, the cutting tool 100 can be an underground cutter (e.g., a five inch underground cutter). Traditional ram return arrangements may not be suitable for the five inch underground cutter tool since this tool requires a longer stroke length requiring a longer compressed spring height and longer tool. Some systems use extensions springs; however, this prohibits the use of a two-stage system and also significantly increases cut time.

The tool 100 can include a two-stage system and can include two tie rods 102 that rest on a ram 104 via a plate 106 (i.e., a ram plate). The two tie rods 102 can thread into the plate 106 near a tool head 110 and are coupled at an opposite end by a secondary plate 108 (i.e., an actuator plate). The tool 100 can further include the ram 104 at a ram section 124, a cylinder 126, and a valving system 128 (see FIG. 5). As illustrated, the cylinder 126 extends in a direction that is parallel to each of the tie rods 102. In general, the tool 100 can further include an electric motor configured to drive a pump by way of a gear reducer. The pump can be configured to provide pressurized hydraulic fluid to a hydraulic actuator cylinder 132 (see FIGS. 2-4) within the cylinder 126. The hydraulic actuator cylinder 132 can include a piston 134 slidably accommodated. In some embodiments, a frame and a bore of the tool 100 can form the actuator cylinder 132.

Figure 2:
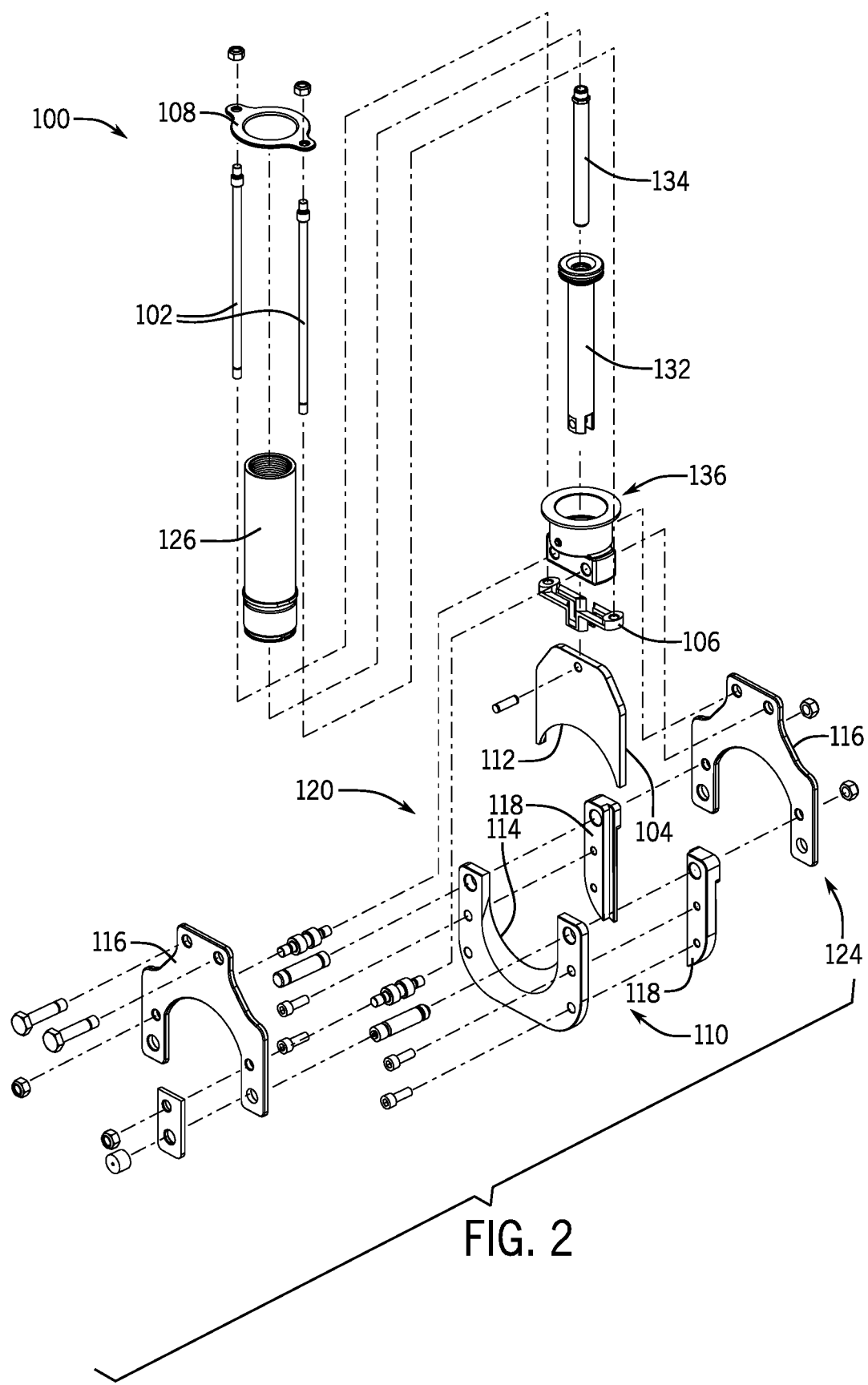
FIG. 2 is an exploded isometric view of the cutting tool of FIG. 1.

FIG. 2 illustrates an exploded view of the cutting tool 100. As briefly described above, the tie rods 102 can extend in a direction parallel to the cylinder 126 and can be secured to the ram plate 106 (near the ram section 124) and can also be secured to the secondary plate 108. The ram plate 106 may be secured to a portion of the tool head 110. The tool head 110 can include the ram 104 having a first cutting surface 112 configured as a cutting blade coupled to a frame 120 of the tool head 110 opposite a second cutting surface 114 of the tool head 110. The tool head 110 can further include a pair of face guides 116 and lateral guides 118 to guide the ram 104 during a cutting action and support the tool head 110.

The piston 134 can be coupled to a mechanism 136 that is configured to move the ram 104 of the cutting tool 110. When the piston 134 is retracted, the first cutting surface 112 may be at a maximum distance from the second cutting surface 114 (e.g., an open position). When pressurized fluid is provided to the cylinder 132 by way of the pump, the fluid pushes the piston 134 inside the cylinder 132, and the piston 134 can be extended. As the piston 134 extends, the mechanism 136 causes the ram 104 to move toward a closed or working position and the cutting surface 112, 114 are moved closer to each other. As the cutting surfaces 112, 114 are moved closer to each other, guided by the face guides 116 and the lateral guides 118, a cable or other work piece placed in a work zone 138 of the tool head 110 can be cut, crimped, or otherwise impacted. After a cutting operation is performed, high pressure fluid can be sent back to a fluid reservoir, as described below.

Figure 3:
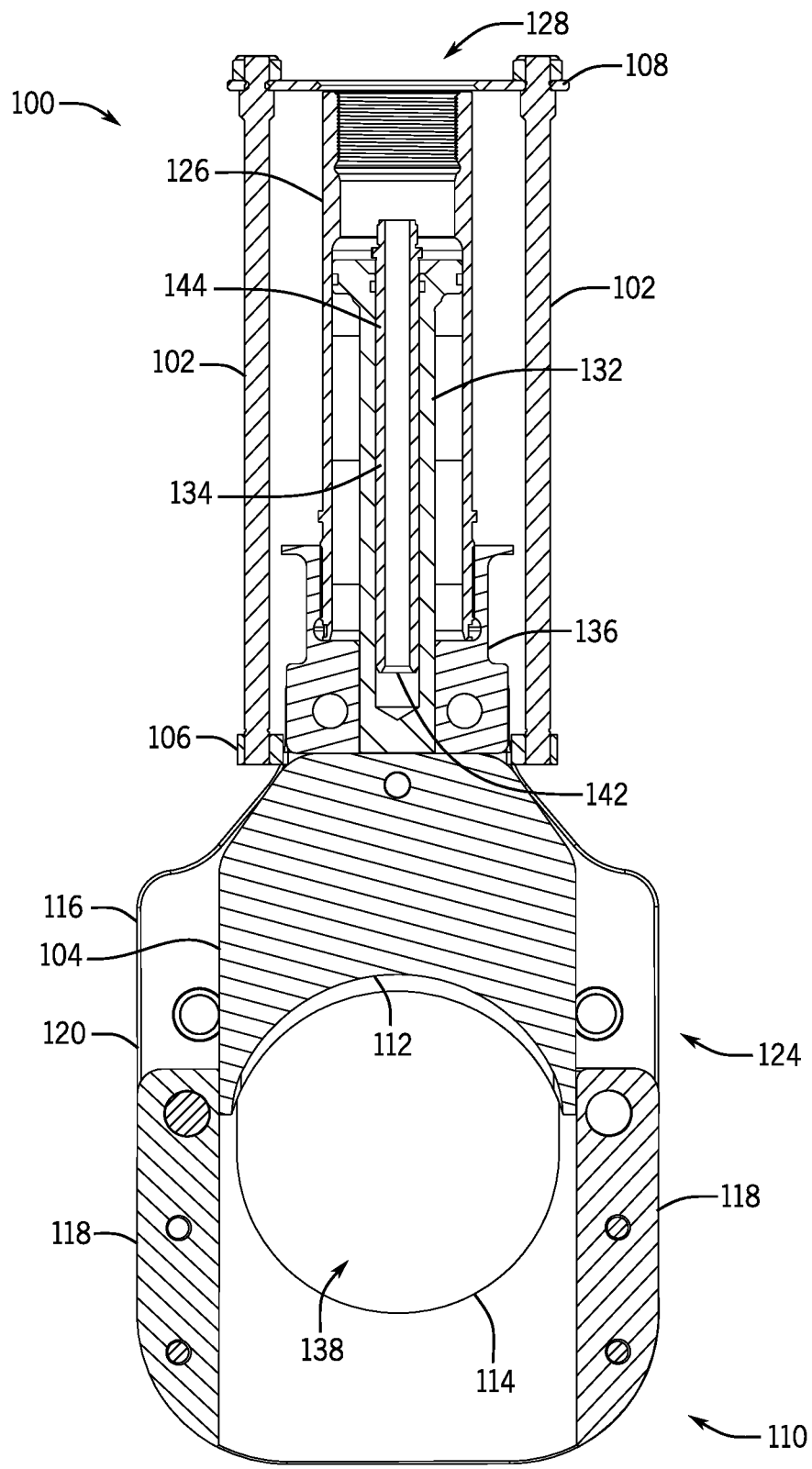
FIG. 3 is a front cross-sectional view of the cutting tool of FIG. 1.

FIG. 3 illustrates a cross-sectional side view of the cutting tool 100. The cutting tool 100 includes the piston 134 that is partially hollow and slidably accommodated within the cylinder 132. The piston 134 includes a piston head 142 and a piston rod 144 extending from the piston head 142 along a central axis of the cylinder 126. In use, a motor can drive a pump to provide pressurized fluid through a valve, such as a check valve, for example, and into the piston 134.

Figure 4:
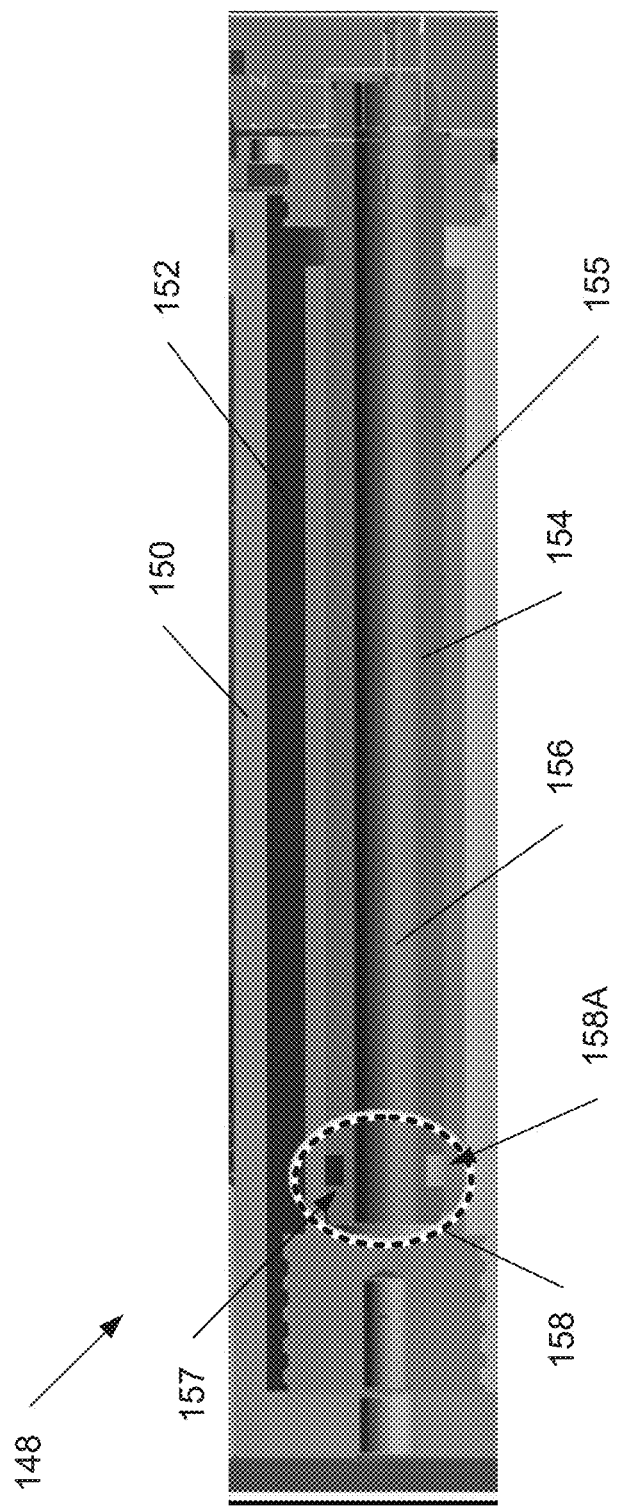
FIG. 4 is a cross-sectional view of an oil seal of a cutting tool according to some embodiments of the invention.

FIG. 4 is a ram assembly 148 that may be used within the tool 100. The ram assembly 148 is configured to improve speed of ram movement. The ram assembly 148 includes a ram 150 (i.e., an outer ram) that defines an outer bore 152. The ram 150 can be coupled to the frame 120 to move the first cutting surface 112. The ram assembly 148 further includes a piston 154 (i.e., an inner ram) having an inner bore 156. The piston 154 can be received within a ram cavity of a conduit tube 155. The piston 154 further includes an annular groove 157 configured to receive a seal ring 158A positioned at the circled area 158 can be used to prevent leakage of oil or other fluid from the inner bore 156 to the outer bore 152. In some embodiments, the piston 154 of FIG. 4 may be the piston 134 of FIG. 2 and the ram 150 of FIG. 4 may be the hydraulic actuator of FIG. 2.

In use, the inner bore 156 may be filled first with a fluid. Advantageously, the inner bore 156 fills with the fluid before the outer bore 152 to improve ram speed. As described above, the seal ring 158A prevents oil from passing between the inner bore 156 and the outer bore 152. In some embodiments, an extension spring (not shown) can extend along the length of the inner bore 156 and can be threaded at each end. In general, the starting length of the tool may be the compressed length.

Figure 5:
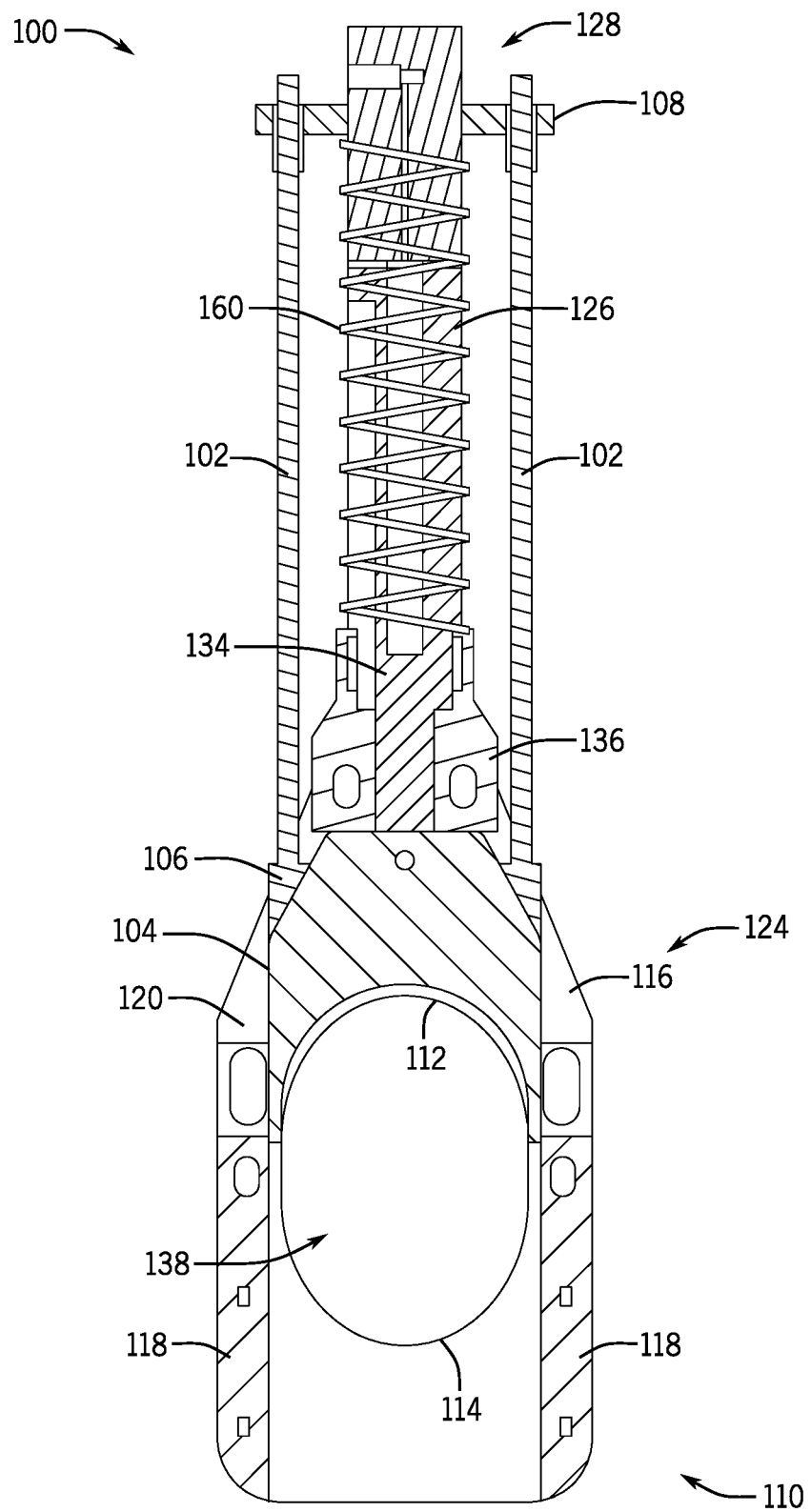
FIG. 5 is a cross-sectional side view of a cutting tool with a compression spring according to some embodiments of the invention.

Referring now to FIG. 5, in some embodiments, a large external compression spring 160 can be arranged outside of the cylinder 126 of the tool 100. The compression spring 160 can be compressed between the ram section 124 and each of the plate 106 and the secondary plate 108. When the spring 160 extends, the ram 104 attached to the plate 106 can pull the bottom opposing secondary plate 108 in to compress the spring 160. When the system reaches pressure or a specific position, the valving system 128 changes to relive the pressure and creates a flow path from an oil reservoir. As this occurs, the spring 160 forces the secondary plate 108 to pull the plate 106 and retract the ram 104 and fluid returns to the reservoir.

Figure 6:
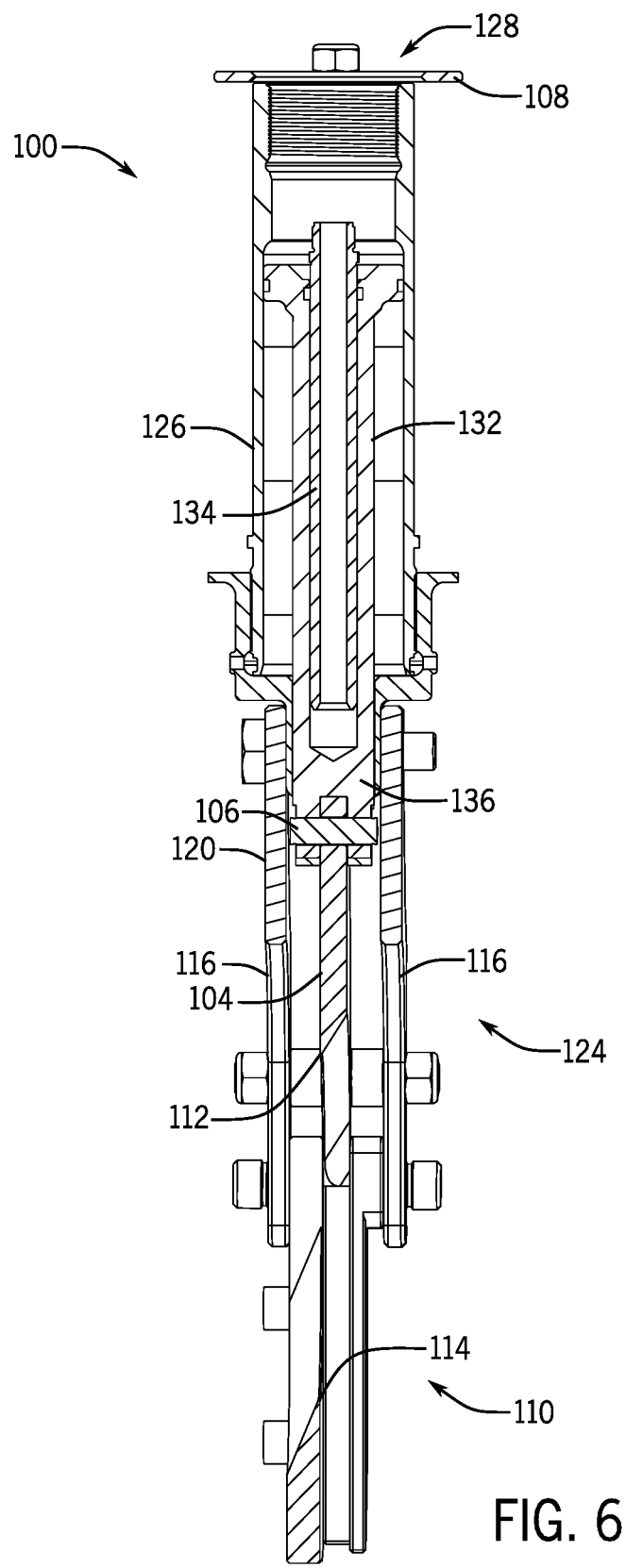
FIG. 6 is a cross-sectional side view of the cutting tool of FIG. 1.
Figure 7:
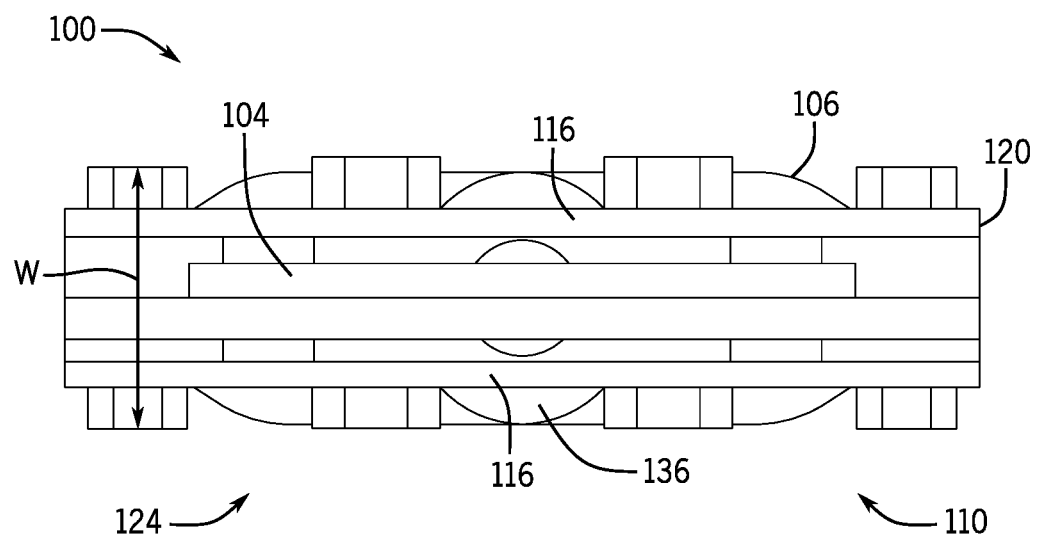
FIG. 7 is a cross-sectional view of a cutting head of the cutting tool of FIG. 1.

FIGS. 6 and 7 illustrate additional cross sections of the tool 100. In particular, FIG. 6 illustrates the symmetric configuration about an axis of the hydraulic actuator cylinder 132 and the piston 134. FIG. 7 illustrates a top cross-sectional view of the tool 100 that defines a width w of the tool head 110. In the illustrated embodiment, the width w may be between approximately 2 inches and 4 inches (approximately 5 cm and 11 cm, or preferably, approximately 3.1 inches (approximately 7.9 cm).

Figure 8:
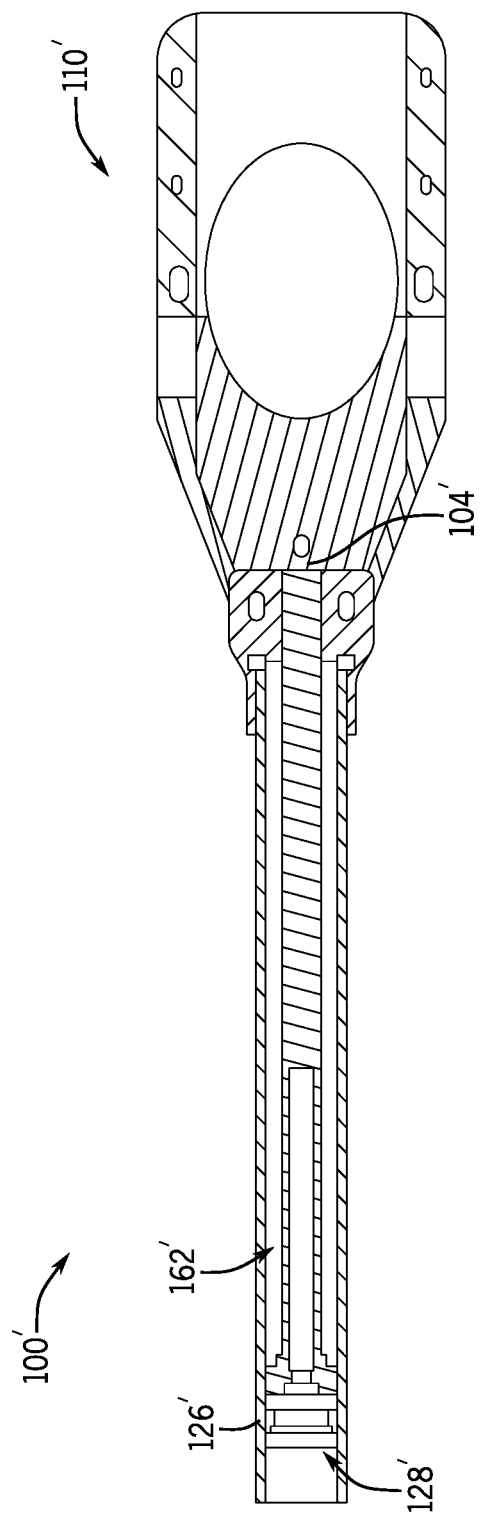
FIG. 8 is a cross-sectional side view of a cutting tool with a gas spring according to some embodiments of the invention.

FIG. 8 illustrates a tool 100' according to another embodiment of the invention. The tool 100' may be similar to the tool 100 and can be configured as a cutting tool. Like the tool 100, the tool 100' can include a tool head 110' that is substantially similar to the tool head 110. In the illustrated embodiment, the tool 100' is configured as a two-stage tool. In particular, the tool 100' can include a gas spring mechanism. In general, a gas spring mechanism can operate similarly to a mechanical coil spring and can be used to store energy by compressing the gas. A gas spring mechanism is a closed system that requires no further gas to be introduced for the system to operate once charged with a gas, such as nitrogen, for example.

In general, metering a gas spring system can control the rate of extension or compression of a gas spring mechanism. For example, altering piston orifice sizes or creating other restrictive flow paths can meter the gas flow and control the rate of extension. Fundamentally, a larger piston orifice or shorter flow path can correspond to a lower pressure drop, and the faster a moveable piston will can extend.

In use, gas can be pressurized in a first chamber 162' within a cylinder 126' as a back portion (relative to FIG. 8) is filled with oil. This will extend a ram 104' and compress the gas. When a full pressure is reached, a valving system 128' can change to allow oil to return to the first chamber 162'. The compressed energy may then be released to drive a ram 104'.

Figure 9:
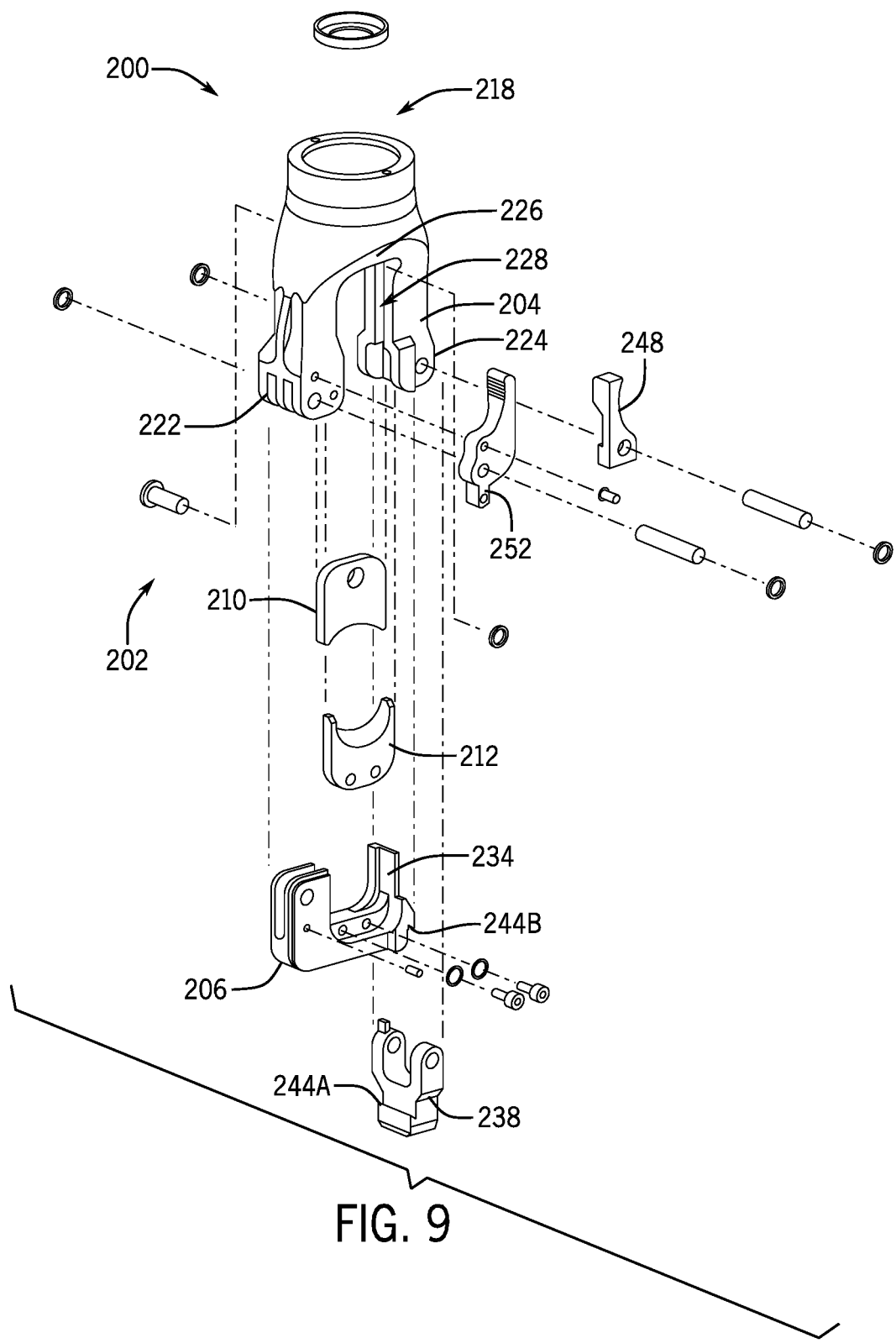
FIG. 9 an exploded view of a cutting tool according to another embodiment of the invention.
Figure 10:
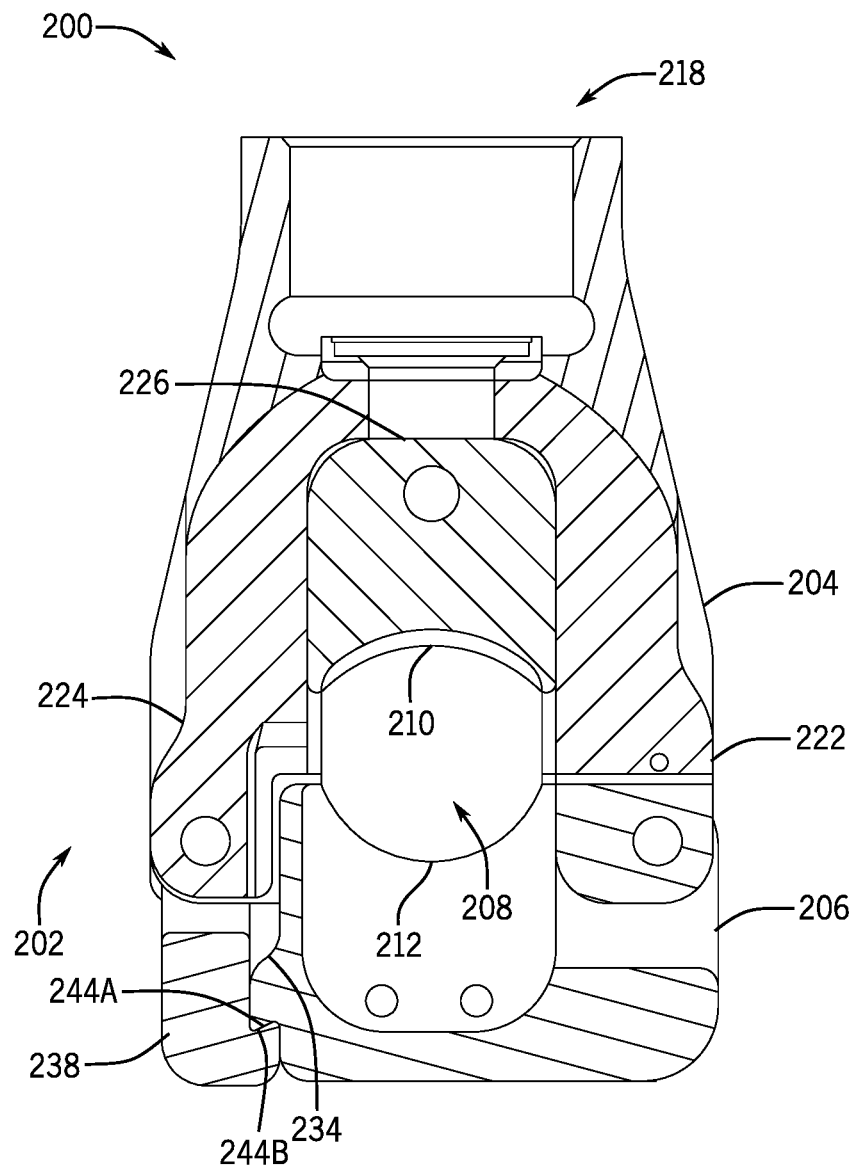
FIG. 10 is a cross-sectional side view of the cutting tool of FIG. 9.
Figure 11:
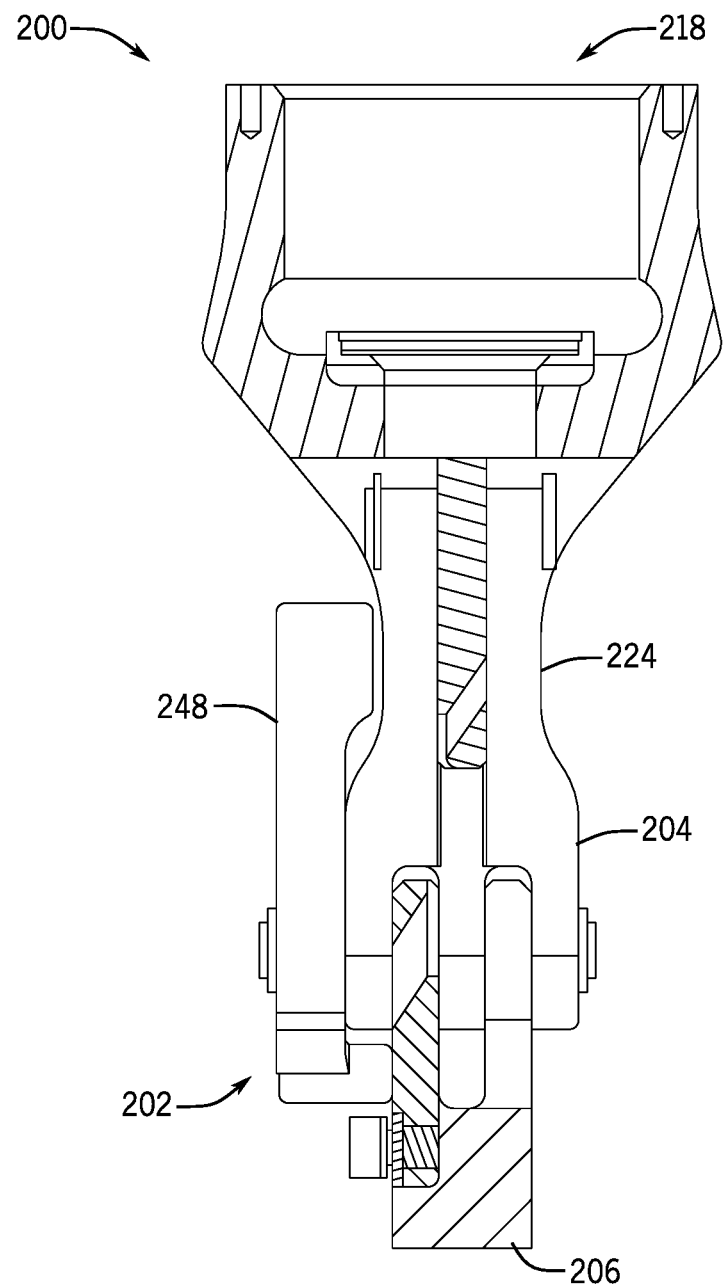
FIG. 11 is a cross-sectional side view of the cutting tool of FIG. 9.

FIGS. 9-11 illustrate another cutting tool 200 according to an embodiment of the invention. The cutting tool 200 includes a tool head 202. The tool head 202 includes a first frame 204 and a second frame 206. The second frame 206 is moveable relative to the first frame 204 so that the tool head 202 can be opened to insert an object into a cutting zone 208 and closed to facilitate cutting the object in the cutting zone 208. The tool head 202 further includes a first blade 210 slidably disposed in the first frame 204 and a second blade 212 coupled to the second frame 206. The first blade 210 is moveable from a proximal end of the cutting zone 208 to the second blade 212 at a distal end of the cutting zone 208. The first blade 210 and the second blade 212 can thus provide a guillotine-type cutting action.

An actuator assembly, similar to the cutting tools 100 and 100' (i.e., the compression spring and the gas spring mechanisms) can be used with the tool head 202. In general, an actuator assembly can be coupled to a proximal end 218 of the tool head 202 and can be configured to distally move the first blade 210 to cut an object in the cutting zone 208.

The tool head 202 further includes a first arm 222 and a second arm extending from a base 226 of the first frame 204. In the illustrated embodiment, the first frame 204 is in the form of a clevis (i.e., U-shaped). The first blade 210 is slidably disposed in the first frame 204 between the first arm 222 and the second arm 224. The first and second arms 222, 224 can define a guide channel 228 to help maintain the alignment of the first blade 210 relative to the second blade 212. As briefly described above, the second blade 212 can be coupled (e.g., releasably coupled) to the second frame 206. The second frame 206 can be hingedly coupled to the first arm 222 of the first frame 204. In a closed-frame position (see FIG. 10), the second frame 206 extends from the first arm 222 to the second arm 224 so that the cutting zone 208 is bounded by the first blade 210, the second blade, 212, the first arm 222, and the second arm 224.

A second end 234 of the second frame 206 is releasably coupled to the second arm 224 of the first frame 204 via a latch 238. The latch 238 is configured to rotate relative to the second arm 224 between a closed-latch position and an open-latch position. In the closed-latch position, the latch 238 can couple the second arm 224 to the second frame 206. In the open-latch position, the latch 238 releases the second arm 224 from the second frame 206.

To releasably couple the latch 238 to the second frame 206, the latch 238 and the second frame 206 include corresponding retention structures 244A, 244B. For example, in FIG. 11, the latch 238 includes a proximally-sloped top surface 244A that engages a distally-sloped bottom surface 244B of the second frame 206 when the latch 238 is in the closed-latch position and the second frame 206 is in the closed-frame position. The pitch of the sloped surfaces 244A, 244B is configured such that the surface 244A of the latch 238 can release from the surface 244B of the second frame 206 when the latch 238 moves to the open-latch position. Similarly, the pitch of the sloped surfaces 244A, 244B is configured such that the engagement between the surface 244A and the surface 244B prevents rotation of the second frame 206 when the second frame 206 is in the closed-frame position and the latch 238 is in the closed-latch position.

A release lever 248 is coupled to the latch 238 and operable to move the latch 238 from the closed-latch position to the open-latch position. The release lever 248 can be hingedly coupled to the second arm 224 via a pin so that the release lever 248 and the latch 238 pivot about a common pivot point. The release lever 248 receives a proximal portion of the latch 238 in a slot on an inner side of the release lever 248. In this arrangement, the slot engages the proximal portion of the latch 238 so that rotation of the release lever 248 causes corresponding rotation of the latch 238. The release lever 248 is thus operable by a user to release the second frame 206 from the latch 60 and the second arm 224 so that the second frame 206 can be moved from the closed-frame position to the open-frame position.

The latch 238 can be biased towards the closed-latch position by a biasing member. For example, the biasing member can be a spring extending between the second arm 224 and the latch 238 to bias the latch 238 toward the closed-latch position. Because the second arm 224 is fixed and the latch 238 is rotatable, the spring applies a biasing force directed from the second arm 224 to the proximal portion of the latch 238. In this arrangement, the spring thus biases the latch 238 to rotate counter-clockwise toward the closed-latch position.

The tool head 202 further includes a trip lever 252 hingedly coupled to the first arm 222. In particular, the trip lever 252 is operable to rotate between an open-lever position and a closed-lever position. In the open-lever position, the trip lever 252 is positioned outside of the cutting zone 208. For example, the trip lever 252 extends generally parallel to the first arm 222 in the open-lever position. Because the trip lever 252 is outside of the cutting zone 208 in the open-lever position, the trip lever 252 does not affect or obstruct the cutting of an object in the cutting zone 208 by the first blade 210 and the second blade 212. In the closed-lever position, the trip lever 252 extends into the cutting zone 208. For example, the trip lever 252 extends from the first arm 222 to the second arm 224 in the closed-lever position. More particularly, the trip lever 252 is generally perpendicular to the first arm 222 and the second arm 224 in the closed-lever position.

The trip lever 252 is fixedly coupled to the second frame 206. As a result, the trip lever 252 is in the open-lever position when the second frame 206 is in the closed-frame position and the trip lever 252 is in the closed-lever position when the second frame 206 is in the open-frame position. Further, moving the second frame 206 from the closed-frame position to the open-frame position causes the trip lever 252 to move from the open-lever position to the closed lever-position. Moving the trip lever 252 from the closed-lever position to the open-lever position causes the second frame 206 to move from the open-frame position to the closed-frame position. A user can thus use the trip lever 252 to as an actuator for moving the second frame 206. The trip lever 252 can include a grip portion to facilitate such use of the trip lever 252. Additional embodiments and examples of a cutting tool are described in detail in U.S. Pat. No. 10,967,442, which is incorporated herein by reference in its entirety.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A hydraulic cutter tool comprising:
a cylinder;
a first frame;
a first cutting blade coupled to the first frame;
an outer ram including an outer bore to receive hydraulic fluid, the outer ram movably received within the cylinder and is coupled to the first frame;
a conduit tube coupled to the outer ram within the outer bore, the conduit tube including a ram cavity;
an inner ram including an inner bore to receive hydraulic fluid, the inner ram positioned inside the ram cavity of the conduit tube, and the inner ram including an annular groove;
a seal positioned in the annular groove so that the seal is positioned within the ram cavity to contact between the conduit tube and the inner ram to prevent leakage between the inner bore and the outer bore; and
a valve fluidly coupled to the inner bore and the outer bore to control a flow of hydraulic fluid so that the inner bore fills with hydraulic fluid before the outer bore to move both the conduit tube and the outer ram in a first direction toward an extended position to actuate the first cutting blade.

2. The hydraulic cutter tool of claim 1 wherein the inner bore filling with hydraulic fluid before the outer bore improves ram movement speed.

3. The hydraulic cutter tool of claim 1 wherein the seal is an O-ring.

4. The hydraulic cutter tool of claim 1, wherein the first frame includes a first arm and a second arm that extend from a base of the first frame, and the first blade is slidably disposed between the first arm and the second arm.

5. The hydraulic cutter tool of claim 4 further comprising:
a second frame that moves relative to the first frame between an open-frame position to allow a workpiece to be placed into a cutting zone defined between the first frame and the second frame, and a closed-frame position to allow cutting of the workpiece within the cutting zone; and
a second blade coupled to the second frame.

6. The hydraulic cutter tool of claim 5, wherein the cutting zone is bounded by the first blade, the second blade, the first arm, and the second arm when the second frame is in the closed-frame position.

7. The hydraulic cutter tool of claim 5, wherein a first end of the second frame is pivotally coupled to the first arm of the first frame and a second end of the second frame is releasably coupled to the second arm of the first frame.

8. The hydraulic cutter tool of claim 7, wherein the second frame is releasably coupled to the second arm of the first frame by a latch that is pivotally coupled to the second arm of first frame to rotate between a closed-latch position and an open-latch position, the latch including a first retention feature that engages with a corresponding second retention feature on the second frame to prevent rotation of the second frame when the second frame is in the closed-frame position and the latch is in the closed-latch position.

9. The hydraulic cutter tool of claim 8, wherein the first retention feature is a first sloped surface and the second retention feature is a second sloped surface.

10. The hydraulic cutter of claim 8, wherein a release lever is hingedly coupled to the second frame, the release lever including a slot that engages the latch so that rotation of the release lever causes corresponding rotation of the latch.

11. The hydraulic cutter of claim 5, wherein a trip lever is hingedly coupled to the first arm to rotate between an open-lever position and a closed-lever position.

12. The hydraulic cutter of claim 11, wherein the trip lever is positioned outside of the cutting zone in the open-lever position and extends into the cutting zone in the closed-lever position.

13. The hydraulic cutter of claim 12, wherein the trip lever is in the open-lever position when the second frame is in the closed-frame position, and the trip lever is in the closed-lever position when the second frame is in the open-frame position.

\* \* \* \* \*